United States Patent
Lewis et al.

(10) Patent No.: US 7,143,574 B2
(45) Date of Patent: *Dec. 5, 2006

(54) SYSTEM AND METHOD FOR DETERMINING SET POINT LOCATION FOR OXIDANT-BASED ENGINE AIR/FUEL CONTROL STRATEGY

(75) Inventors: Donald James Lewis, Brighton, MI (US); Kevin Ronald Carlstrom, Fort Wayne, IN (US); Stanley Larue Bower, Jr., Ann Arbor, MI (US); Stephen L. Hahn, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 10/757,873

(22) Filed: Jan. 14, 2004

(65) Prior Publication Data

US 2004/0128984 A1     Jul. 8, 2004

Related U.S. Application Data

(63) Continuation of application No. 10/167,154, filed on Jun. 10, 2002, now Pat. No. 6,769,243, which is a continuation of application No. 09/681,872, filed on Jun. 20, 2001, now Pat. No. 6,453,661, application No. 10/757,873, which is a continuation of application No. 10/603,222, filed on Jun. 24, 2003, now Pat. No. 6,912,844, which is a continuation of application No. 09/681,873, filed on Jun. 20, 2001, now Pat. No. 6,629,409, application No. 10/757,873, which is a continuation of application No. 10/262,322, filed on Oct. 2, 2002, now Pat. No. 6,964,159, which is a continuation of application No. 09/681,870, filed on Jun. 20, 2001, now Pat. No. 6,497,093, and a continuation of application No. 09/681,874, filed on Jun. 20, 2001, application No. 10/757,873, which is a continuation of application No. 10/167,275, filed on Jun. 10, 2002, which is a continuation of application No. 09/681,875, filed on Jun. 20, 2001, now Pat. No. 6,453,662.

(51) Int. Cl.
F01N 3/00     (2006.01)

(52) U.S. Cl. .................. 60/277; 60/274; 60/276; 60/285

(58) Field of Classification Search .................. 60/274, 60/276, 277, 285, 286
See application file for complete search history.

(56) References Cited

U.S. PATENT DOCUMENTS 4,729,220 A     3/1988     Terasaka et al.

(Continued)

FOREIGN PATENT DOCUMENTS

EP     0733787     9/1996

(Continued)

OTHER PUBLICATIONS

Sae 1999-01-3476, "A Simplified Approach to Modeling Exhaust System Emissions: SIMTWC", Laing et al.

(Continued)

*Primary Examiner*—Binh Q. Tran
(74) *Attorney, Agent, or Firm*—Allan J. Lippa; Alleman Hall McCoy Russell & Tuttle LLP

(57) ABSTRACT

The invention relates to a new method and system for optimizing the efficiency of an automotive catalytic converter by adjusting the engine air/fuel ratio based on estimates of the actual amount of oxidants stored in the catalyst. An available oxidant storage capacity of the catalyst is determined by establishing an oxidant set point location, i.e., a location in the catalyst about which the system controls the oxidant storage. The oxidant set point is established based on the temperatures of the different potential set point locations and the levels of deterioration of the different potential set point locations, as well as the oxidant storage capacity of the emission control device system.

30 Claims, 9 Drawing Sheets

U.S. PATENT DOCUMENTS

| | | | |
|---|---|---|---|
| 5,158,063 A | 10/1992 | Hosoda et al. | |
| 5,274,559 A | 12/1993 | Takahashi et al. | |
| 5,325,664 A | 7/1994 | Seki et al. | |
| 5,335,538 A | 8/1994 | Blischke et al. | |
| 5,412,945 A * | 5/1995 | Katoh et al. | 60/285 |
| 5,475,975 A | 12/1995 | Nasu | |
| 5,509,267 A | 4/1996 | Theis | |
| 5,595,060 A | 1/1997 | Togai et al. | |
| 5,609,023 A | 3/1997 | Katoh et al. | |
| 5,610,844 A | 3/1997 | Maus et al. | |
| 5,625,750 A | 4/1997 | Puskorius et al. | |
| 5,626,014 A | 5/1997 | Hepburn et al. | |
| 5,649,420 A | 7/1997 | Mukahira et al. | |
| 5,678,402 A | 10/1997 | Kitigawa et al. | |
| 5,732,551 A | 3/1998 | Katoh et al. | |
| 5,784,880 A | 7/1998 | Toshiro et al. | |
| 5,842,339 A | 12/1998 | Bush et al. | |
| 5,842,340 A | 12/1998 | Bush et al. | |
| 5,848,528 A | 12/1998 | Liu | |
| 5,857,163 A | 1/1999 | Trombley et al. | |
| 5,878,567 A | 3/1999 | Adamczyk, Jr. et al. | |
| 5,881,552 A | 3/1999 | Iwata et al. | |
| 5,894,724 A | 4/1999 | Minowa et al. | |
| 5,956,941 A | 9/1999 | Cullen et al. | |
| 5,966,930 A | 10/1999 | Hatano et al. | |
| 5,970,707 A | 10/1999 | Sawada et al. | |
| 6,032,461 A | 3/2000 | Kinugasa et al. | |
| 6,052,989 A | 4/2000 | McCabe et al. | |
| 6,057,605 A | 5/2000 | Bourne et al. | |
| 6,089,017 A | 7/2000 | Ogawa et al. | |
| 6,092,369 A | 7/2000 | Hosogai et al. | |
| 6,116,021 A | 9/2000 | Schumacher et al. | |
| 6,155,242 A | 12/2000 | Kotwicki et al. | |
| 6,170,475 B1 | 1/2001 | Lewis et al. | |
| 6,185,933 B1 | 2/2001 | Tsuzuki et al. | |
| 6,216,450 B1 * | 4/2001 | Takahashi et al. | 60/276 |
| 6,226,982 B1 | 5/2001 | Poggio et al. | |
| 6,272,850 B1 | 8/2001 | Grant et al. | |
| 6,282,889 B1 | 9/2001 | Kakuyama et al. | |
| 6,289,673 B1 | 9/2001 | Tayama et al. | |
| 6,314,724 B1 | 11/2001 | Kakuyama et al. | |
| 6,318,075 B1 | 11/2001 | Gunther et al. | |
| 6,370,868 B1 | 4/2002 | Kolmanovsky et al. | |
| 6,374,596 B1 | 4/2002 | Taga et al. | |
| 6,405,527 B1 | 6/2002 | Suzuki et al. | |
| 6,453,661 B1 * | 9/2002 | Lewis et al. | 60/277 |
| 6,453,662 B1 | 9/2002 | Lewis et al. | |
| 6,477,833 B1 * | 11/2002 | Tayama et al. | 60/285 |
| 6,481,201 B1 | 11/2002 | Kako et al. | |
| 6,494,037 B1 | 12/2002 | Oguma et al. | |
| 6,502,389 B1 | 1/2003 | Katayama et al. | |
| 6,546,719 B1 | 4/2003 | Kamoto et al. | |
| 6,629,409 B1 | 10/2003 | Lewis et al. | |
| 6,751,947 B1 | 6/2004 | Lewis et al. | |
| 6,766,640 B1 * | 7/2004 | Ishizuka et al. | 60/285 |
| 2001/0013221 A1 | 8/2001 | Suzuki et al. | |
| 2002/0078683 A1 | 6/2002 | Katayama et al. | |
| 2003/0046927 A1 | 3/2003 | Nagai et al. | |
| 2003/0070419 A1 | 4/2003 | Kako et al. | |

FOREIGN PATENT DOCUMENTS

| | | |
|---|---|---|
| EP | 0831226 | 3/1998 |
| EP | 1061245 | 12/2000 |
| EP | 1128042 | 8/2001 |
| EP | 1253309 | 10/2002 |
| GB | 2344771 | 6/2000 |
| GB | 2356160 | 5/2001 |

OTHER PUBLICATIONS

James C. Peyton et al; A Simplified Model for the Dynamics of a Three-Way Catalytic Converter; Reprinted from: Exhaust Aftertreatment Modeling and Gasoline Direct Injection Aftertreatment (SP-1533) SAE International Technical Paper Series, Warrendale, Pennsylvania, USA.

SAE 800052 Air-Fuel Control to reduce emissions, II. Engine-catalyst characterization under cyclic conditions; Wei-Ming Wang; Congress and Exposition, Cobo Hall, Detroit, MI, Feb. 25-29, 1980.

* cited by examiner

SYSTEM AND METHOD FOR DETERMINING SET POINT LOCATION FOR OXIDANT-BASED ENGINE AIR/FUEL CONTROL STRATEGY

CROSS-REFERENCE TO RELATED APPLICATIONS

This application claims priority under 35 U.S.C. § 120, and is a continuation of Ser. No. 10/167,154 filed Jun. 10, 2002, now U.S. Pat. No. 6,769,243, which is a continuation of U.S. Pat. No. 6,453,661 issued Sep. 24, 2002, Ser. No. 09/681,872 filed Jun. 20, 2001, and is also a continuation of Ser. No. 10/603,222 filed Jun. 24, 2003, now U.S. Pat. No. 6,912,844 which is a continuation of U.S. Pat. No. 6,629,409 issued Oct. 7, 2003, Ser. No. 09/681,873 filed Jun. 20, 2001, which are hereby incorporated by reference in their entirety for all purposes. This application also claims priority under 35 U.S.C. § 120, and is a continuation application, of the following U.S. patents and patent application, which are hereby incorporated by reference in their entirety for all purposes: Ser. No. 10/262,322 filed Oct. 2, 2002 now U.S. Pat. No. 6,964,159 which is a continuation of U.S. Pat. No. 6,497,093 issued Dec. 24, 2002, Ser. No. 09/681,870 filed Jun. 20, 2001; Ser. No. 09/681,874 filed Jun. 20, 2001; and Ser. No. 10/167,275 filed Jun. 10, 2002 which is a continuation of U.S. Pat. No. 6,453,662, Ser. No. 09/681,875 filed Jun. 20, 2001.

This application also incorporates by reference in its entirety for all purposes U.S. Pat. No. 5,282,360 issued Feb. 1, 1994 to Hamburg et al.

FIELD OF THE INVENTION

The present invention relates generally to adjusting the air/fuel ratio in the cylinders of an internal combustion engine to control automotive emissions. More particularly, the present invention relates to a method and system for determining an oxidant set point location inside of a catalytic converter that is used in connection with a system that adjusts the air/fuel ratio in the cylinders based on the amount of oxidants stored in the catalytic converter.

BACKGROUND OF THE INVENTION

To minimize the amount of emissions exhausted into the atmosphere, modern automotive vehicles generally include one or more catalytic converters, or emission control devices, in the exhaust system of the vehicle. These emission control devices store oxygen and NOx (collectively, "oxidants") from the vehicle exhaust stream when the engine is operated with a relatively lean air/fuel ratio. On the other hand, when the engine is operated with a relatively rich air/fuel ratio, they release the stored oxygen and NOx, which then react with the HC and CO produced by the engine. In this way, the emission of both NOx and hydrocarbons (HC and CO) into the atmosphere is minimized.

The inventors have recognized a disadvantage with conventional air-fuel ratio control systems. In particular, the inventors have recognized that these systems attempt to maintain the engine at stoichiometry (or another desired air/fuel ratio). However, this has the disadvantage that engine air-fuel control is decoupled from the state of oxidant storage of the emission control device. The conventional system relies on air-fuel feedback to compensate for this oversight.

To overcome disadvantages with prior approaches, the inventors have developed a method for controlling the engine air-fuel ratio to maintain the oxidant level stored in the emission system at a desired set-point level. However, the inventors have further recognized that there is another dimension to the emission system, namely the depth into catalyst along the direction of flow. I.e., oxidants are stored in different proportions depending on the depth, or length, of the catalyst brick. For example, at the front face of a catalyst brick, there is a high chance of oxidants being stored than at the back of the brick. As such, a control system that controls the engine based on the oxidants stored in the emission control device should consider where along the depth of the catalyst the set-point is chosen.

SUMMARY OF THE INVENTION

The above disadvantages are overcome by a method for controlling engine air-fuel ratio of an engine coupled to an emission control device having a predetermined length in a direction of exhaust flow. The method comprises:

selecting a position along the length of the emission control device; and adjusting an operating parameter that affects engine air-fuel ratio based on an amount of oxidants stored in the emission control device and said position.

By selecting a location along the length of the catalyst for use in adjusting engine air-fuel ratio, it is possible to provide a minimum amount of oxidants storage reserve to account for oxidant storage control errors, while at the same compensating for changes in catalyst temperature and catalyst degradation.

In other words, oxidant storage capacity of a catalytic converter varies largely dependent on catalyst temperature and deterioration. Further, bricks in a multiple-brick catalytic converter tend to heat up (increasing their capacity) and deteriorate (decreasing their capacity) from the front of the catalytic converter to the rear. The inventive system for controlling engine air/fuel ratio recognizes that the available oxidant storage capacity of the catalyst is that which exists forward of the oxidant set point location. The present invention can then adjust the set point location in the catalyst based on the temperatures of the catalyst bricks, as well as their levels of deterioration. Specifically, the set point location starts out being positioned just behind the front-most brick in the catalyst. If the temperature of the second brick is sufficiently high to provide adequate oxidant storage capability, or if the deterioration level of the first brick exceeds a certain reference level, then the set point location is moved to just behind the second brick. This process is repeated for all of the bricks in the catalytic converter until a set point location is determined. The set point location also depends upon there being sufficient oxidant reserve capacity in the bricks positioned behind the set point.

Thus, by maintaining sufficient, but not excessive, reserve capacity behind the selected control position, improved performance results.

Note that the selection of the position along the catalyst length can be performed in various ways. The example outlined above is merely one example. Another example would be to select the position based on time since engine start. Further, a single location could be chosen for all vehicle operating conditions that compromises performance and simplicity in engine control.

Also note there are various ways to adjust an operating parameter that affects engine air-fuel ratio based on an amount of oxidants stored in the emission control device and said position. For example, fuel injection or engine airflow can be adjusted. As another example, engine breathing can be adjusted by changing engine valve timing. Further still, engine air-fuel ratio can be adjusted by adjusting fuel vapor purging, fuel injector pressure, or the number of fuel injections.

DESCRIPTION OF A PREFERRED EMBODIMENT

Figure 1:
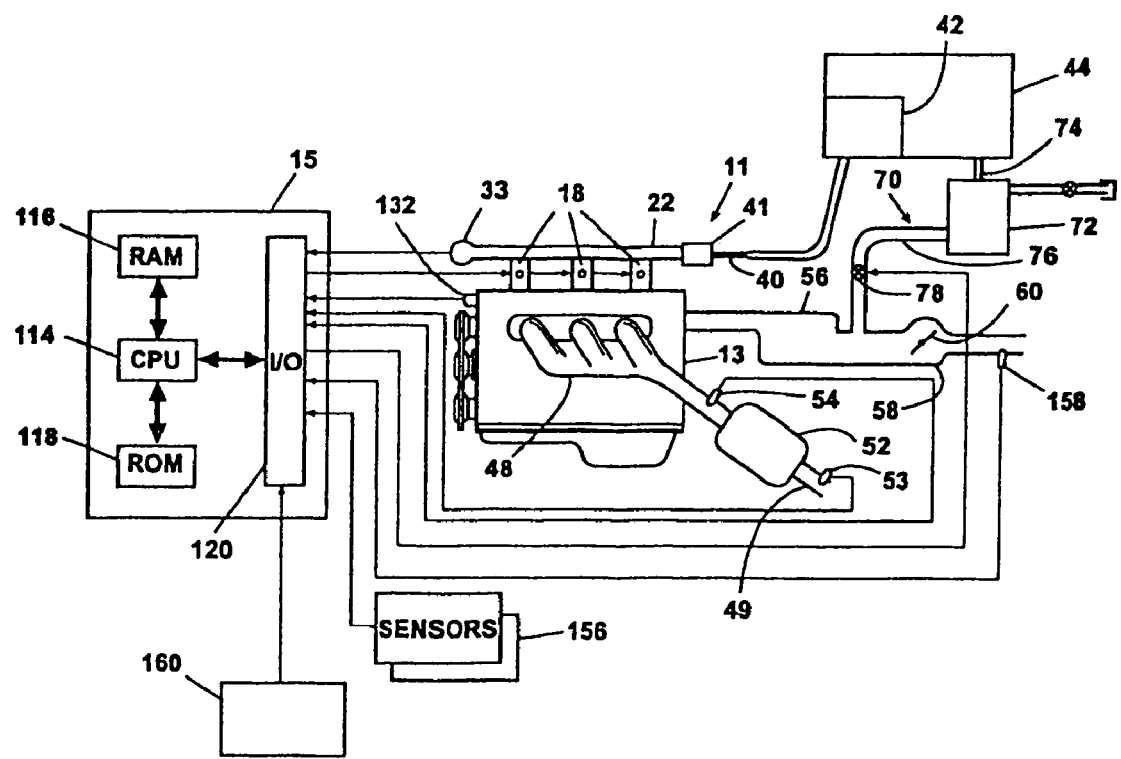
FIG. 1 is an illustrative block diagram of an internal combustion engine, according to a preferred embodiment of the invention.

FIG. 1 illustrates an exemplary internal combustion engine according to a preferred embodiment of the invention. Fuel delivery system 11 of a conventional automotive internal combustion engine 13 is controlled by controller 15, such as an EEC or PCM. Engine 13 comprises fuel injectors 18, which are in fluid communication with fuel rail 22 to inject fuel into the cylinders (not shown) of engine 13, and temperature sensor 132 for sensing temperature of engine 13. Fuel delivery system 11 has fuel rail 22, fuel rail pressure sensor 33 connected to fuel rail 22, fuel line 40 coupled to fuel rail 22 via coupling 41, fuel delivery system 42, which is housed within fuel tank 44, to selectively deliver fuel to fuel rail 22 via fuel line 40.

Figure 9:
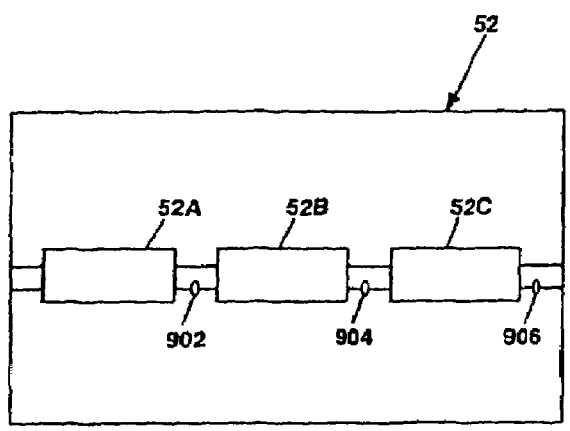
FIG. 9 is a schematic diagram of an exemplary catalytic converter comprising three internal bricks.

Engine 13 also comprises exhaust manifold 48 coupled to exhaust ports of the engine (not shown). Catalytic converter 52 is coupled to exhaust manifold 48. In the preferred embodiment, catalytic converter 52 is a multiple brick catalyst. FIG. 9 illustrates an exemplary multiple brick catalyst having three bricks, 52A, 52B, and 52C. Oxygen sensors 902, 904, and 906, preferably being EGO, UEGO or HEGO sensors, are positioned respectively behind bricks 52A, 52B, and 52C. Referring again to FIG. 1, a first conventional exhaust gas oxygen (EGO) sensor 54 is positioned upstream of catalytic converter 52 in exhaust manifold 48. A second conventional exhaust gas oxygen (EGO) sensor 53 is positioned downstream of catalytic converter 52 in exhaust manifold 48. EGO sensors 53 and 54 may comprise other known oxygen or air/fuel ratio sensors, such as HEGO or UEGO sensors. Engine 13 further comprises intake manifold 56 coupled to throttle body 58 having throttle plate 60 therein. Intake manifold 56 is also coupled to vapor recovery system 70.

Vapor recovery system 70 comprises charcoal canister 72 coupled to fuel tank 44 via fuel tank connection line 74. Vapor recovery system 70 also comprises vapor control valve 78 positioned in intake vapor line 76 between intake manifold 56 and charcoal canister 72.

Controller 15 has CPU 114, random access memory 116 (RAM), computer storage medium 118 (ROM), having a computer readable code encoded therein, which is an electronically programmable chip in this example, and input/output (I/O) bus 120. Controller 15 controls engine 13 by receiving various inputs through I/O bus 120, such as fuel pressure in fuel delivery system 11, as sensed by pressure sensor 33; relative exhaust air/fuel ratio as sensed by EGO sensor 54 and EGO sensor 53, temperature of engine 13 as sensed by temperature sensor 132, measurement of inducted mass airflow (MAF) from mass airflow sensor 158, speed of engine (RPM) from engine speed sensor 160, and various other sensors 156. Controller 15 also creates various outputs through I/O bus 120 to actuate the various components of the engine control system. Such components include fuel injectors 18, fuel delivery system 42, and vapor control valve 78. It should be noted that the fuel may comprise liquid fuel, in which case fuel delivery system 42 is an electronic fuel pump.

Fuel delivery control system 42, upon demand from engine 13 and under control of controller 15, pumps fuel from fuel tank 44 through fuel line 40, and into pressure fuel rail 22 for distribution to the fuel injectors during conventional operation. Controller 15 controls fuel injectors 18 to maintain a desired air/fuel (A/F) ratio.

Figure 2:
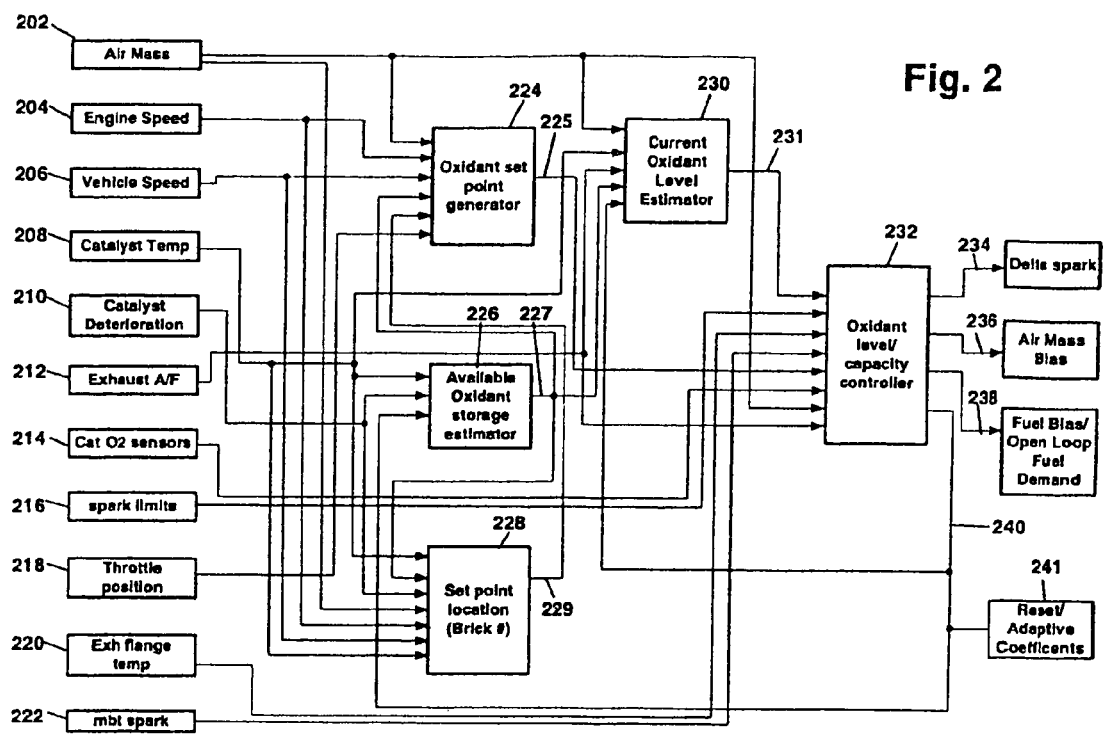
FIG. 2 is a schematic diagram illustrating the major functions of a preferred embodiment of the invented system and method.

Referring now to the logical block diagram of FIG. 2, a preferred embodiment of the invented method of and system for controlling various engine parameters, including the air/fuel ratio in the engine cylinders, engine spark and air mass flow, is described. FIG. 2 illustrates an overview of the invented system and method. Generally speaking, an object of the invention is to adjust the engine air/fuel ratio in such a manner as to maintain the oxidants stored in the catalyst 52 at or near a target oxidant set point. The oxidant set point can be determined in a variety of ways depending on the objectives of the engine control strategy. In a preferred embodiment of the invention, the oxidant set point is determined and adjusted dynamically in response to engine operating parameters. Another object of the invention is to control the oxidant storage capacity of the catalyst 52 by controlling the catalyst temperature through adjusting engine operating parameters, such as engine spark and induction air mass flow (MAF).

Blocks 202 through 222 of FIG. 2 identify the following input variables to the invented system: air mass flow in the intake manifold (202); engine speed (204); vehicle speed (206); catalyst temperature (208); catalyst age (210);

exhaust air/fuel ratio (212); oxidant levels behind each brick in a multi-brick catalyst 52 (214); spark limits (216); throttle position (218); exhaust flange temperature (220); and mbt spark (minimum spark for best torque)(222). One skilled in the art will recognize that these system inputs can be measured, either directly or indirectly, or mathematically estimated according to various methods known in the art. Blocks 224, 226, 228, 230, and 232 of FIG. 2 represent the major algorithms of the invented system, according to a preferred embodiment.

Block 224 of FIG. 2 signifies an oxidant set point generator algorithm. The oxidant set point generator is an algorithm for establishing a desired (or "target") volume of oxidants to be stored in the catalyst 52 as a percentage of the oxidant storage capacity of the catalyst. The target volume of oxidants is also referred to herein as the "oxidant set point." Generally, the oxidant set point is determined based on engine speed and load (which is inferred from air mass flow), vehicle speed, and other operating parameters. The oxidant set point signal (225), i.e., the output of the oxidant set point generator (224), is used by the invented system, and particularly by the oxidant level/capacity controller (block 232) to control engine operation. A more detailed description of the algorithm employed by the oxidant storage set point generator (224) is provided below in connection with a description of FIG. 5.

Block 226 of FIG. 2 signifies an "available oxidant storage estimator" algorithm. The available oxidant storage estimator algorithm (226) estimates the amount of oxidant storage capacity that is available in a catalyst brick. This algorithm is implemented for each brick in a multiple-brick catalyst 52. The available oxidant storage of each brick is estimated based on the catalyst temperature (208) and the catalyst age (210). The estimated available oxidant signal (227) is provided to a "current oxidant level estimator" (block 230) and the oxidant level/capacity controller (232). A more detailed description of the available oxidant storage estimator (226) is provided below in connection with the discussion of FIG. 3.

Block 228 signifies a "set point location" algorithm, which, in connection with a system having a multiple-brick catalyst 52, determines which of the bricks in the catalyst 52 is the "key brick." The key brick is that brick in the catalyst 52 upon which the system bases its engine control strategy. In other words, the invented system attempts to control the engine operation to maintain a particular oxidant level at the key brick. The key brick changes from time to time based on various engine operating conditions. The set point location algorithm (228) determines the key brick based on the catalyst temperature (208), the catalyst age (210), and the available oxidant storage in each brick (signal 227). The output signal of the set point location algorithm (229), i.e., the key brick location, is used by the oxidant storage set point generator (block 224) to determine the oxidant set point value (signal 225). A more detailed description of the set point location algorithm (228) is provided below in connection with the discussion of FIG. 4.

Block 230 of FIG. 2 signifies a "current oxidant level estimator" algorithm, which estimates the instantaneous oxidant level in a catalyst brick. In a system using a multiple brick catalyst 52, the current oxidant level estimator algorithm is implemented for each brick. The oxidant level in each brick is estimated based on the air mass flow (202), the catalyst temperature (208), the exhaust air/fuel ratio (212), and the estimate of available oxidant storage capacity in each of the bricks (227). The estimated amount of oxidants stored in each brick (signal 231) is provided to the oxidant level/capacity controller (232). A more detailed description of the current oxidant level estimator algorithm (230) is provided below in connection with the discussion of FIG. 6.

Block 232 signifies an "oxidant level/capacity controller", which calculates engine control signals intended to cause the engine 13 to function so as to control the oxidant level in the catalyst 52 close to the oxidant set point, as well as to control the oxidant storage capacity of the catalyst 52. Specifically, the oxidant level/capacity controller (232) calculates an air/fuel control bias signal (238) that is used to adjust the air/fuel ratio provided to the engine cylinders. The air/fuel control bias signal (238) is the primary mechanism of adjusting the oxidant level in the catalyst 52. The oxidant level/capacity controller (232) also calculates an air mass bias signal (236) and a delta spark signal (234). The air mass bias and delta spark signals are used to adjust the oxidant storage capacity of the catalyst 52 by controlling the temperature of the catalyst. The oxidant level/capacity controller (232) further calculates Reset/Adaptive Coefficients, which essentially cause the oxidant level prediction algorithms to be reset or adjusted based on feedback signals. A more detailed description of the oxidant level/capacity controller (232) is provided below in connection with a discussion of FIG. 7.

Figure 3:
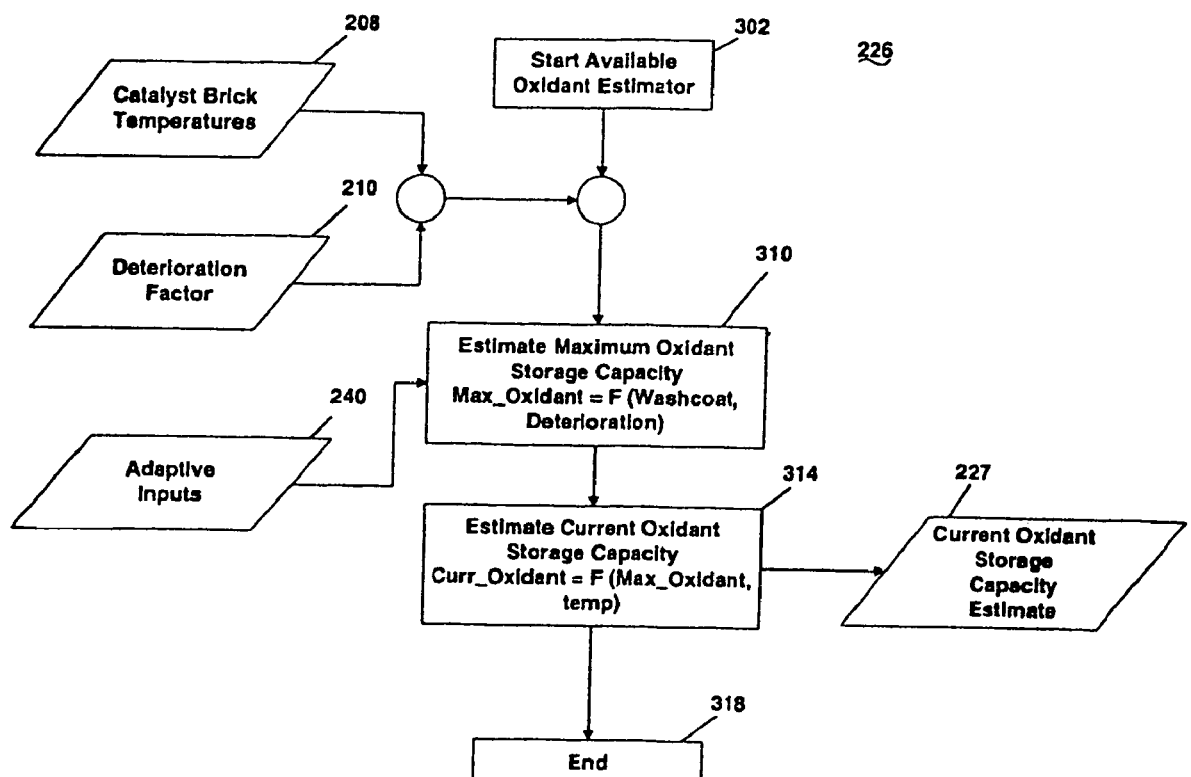
FIG. 3 is a flowchart that illustrates a preferred embodiment of the available oxidant storage estimator algorithm of the present invention.

Referring now to FIG. 3, a more detailed description of the "available oxidant storage estimator" algorithm (226) is provided. The available oxidant storage estimator (226) determines the total oxidant storage capacity that is available in a single brick of catalyst 52. It is desirable to make this calculation for each brick in the catalyst 52 to facilitate the determination of the desired oxidant set point, or oxidant target, in block 224 of FIG. 2. Therefore, for multiple-brick catalysts 52, the available oxidant storage estimator (226) is applied to each brick.

The available oxidant storage capacity in each brick is a function of the wash coat used on the catalyst 52, the temperature of the brick (208), and the deterioration of the brick (210). The wash coat factor, which depends upon the adsorption characteristics of the particular wash coat used on the catalyst 52, is measured in grams per cubic inch and is a constant parameter for a given catalyst. The wash coat parameter can be pre-programmed into the algorithm at the time of manufacture. One skilled in the art will recognize that the temperature of each brick can either be measured using conventional temperature sensors or estimated using various mathematical models.

Finally, the extent of catalyst deterioration can also be determined in a variety of ways. In the preferred embodiment of the invention, the extent of catalyst deterioration is inferred based on the current oxidant storage capacity of the catalyst. A first preferred method for doing so is disclosed in U.S. Pat. No. 5,848,528, which is hereby incorporated by reference. In summary, first, the catalyst is filled with oxidants by running the engine with a lean air/fuel ratio for an extended period of time. After the catalyst is filled, the air/fuel ratio provided to the engine is made rich. The pre-catalyst oxygen sensor 54 detects the rich air/fuel condition in the exhaust almost immediately. However, because the HC and CO produced by the rich engine air/fuel ratio reacts with the stored oxidants in the catalyst, there is a time delay until the post-catalyst oxygen sensor 53 detects a rich air/fuel ratio in the downstream exhaust. The length of the time delay is indicative of the oxidant storage capacity of the catalyst. Based upon the measured time delay, a deterioration factor between 0 and 1 (0 representing total deterioration and 1 representing no deterioration) is calculated. Alternatively, the method could be used in reverse, i.e., the catalyst could be depleted due to extended rich operation, after which the air/fuel ratio would be switched to lean operation. Similar to the original method, the length of the time delay until the post-catalyst sensor 53 registered a change in state would be indicative of the catalyst deterioration.

A second preferred method of estimating the deterioration level of the catalyst uses the estimated current oxidant storage of the catalyst, as derived by the oxidant estimator model (described below in connection with FIG. 6), to predict the level of deterioration of the catalyst. Specifically, as described above, the engine controller 15 receives feedback signals from downstream EGO sensor 53. As is known in the art, when the output signal of an EGO sensor switches from indicating a lean air/fuel condition in the exhaust stream to a rich air/fuel condition (or visa versa), this is an indication of emission breakthrough. In the case of a switch from rich to lean, this is an indication that the oxidant content in the exhaust stream downstream of the catalyst is high, which means that the catalytic converter 52 has reached its capacity in terms of adsorbing oxidants. When this occurs, the oxidant estimator model (described in connection with FIG. 6) is used to estimate the current volume of oxidants stored in the catalytic converter 52. From this estimate of the current oxidant storage volume, the system controller 15 can determine the level and rate of catalyst deterioration in a variety of ways. For example, the controller 15 can compare the current catalytic capacity to previous estimated catalytic capacities to determine the rate of catalyst deterioration. Further, the controller can determine that the catalyst has expended its useful life at the time when the oxidant storage capacity of the catalyst declines to a predetermined value.

Returning to FIG. 3, block 302 signifies the start of the available oxidant storage estimator algorithm. (226) Blocks 208 and 210 illustrate that the individual brick temperatures (208) and the catalyst deterioration factor (210) are dynamic inputs to the algorithm (226). The individual brick temperatures (208) are preferably measured with temperature sensors, and alternative preferred methods for determining the catalyst deterioration factor are described above. At block 310, the theoretical maximum oxidant storage capacity of a catalyst brick during normal operating temperature is calculated. The maximum oxidant storage capacity, being a function of washcoat, is measured at a given temperature. This capacity is then multiplied by the deterioration factor to produce a theoretical maximum oxidant storage.

However, if the current operating temperature is not normal, as during initial start-up conditions, then the current storage capacity of the brick may be less than its theoretical maximum value. Accordingly, the next step, at block 314, is to estimate the current oxidant storage capacity of the brick based on the theoretical maximum storage capacity and the current temperature of the brick. The estimated current oxidant storage capacity is a function of the maximum oxidant storage capacity and the catalyst temperature. The estimated current storage capacity of each brick (in grams per cubic inch) is the final output (227) of the available oxidant storage estimator (226), and it is used as input to each of the other main algorithms described in this invention. The available oxidant storage estimator algorithm is stopped at block 318.

Figure 4:
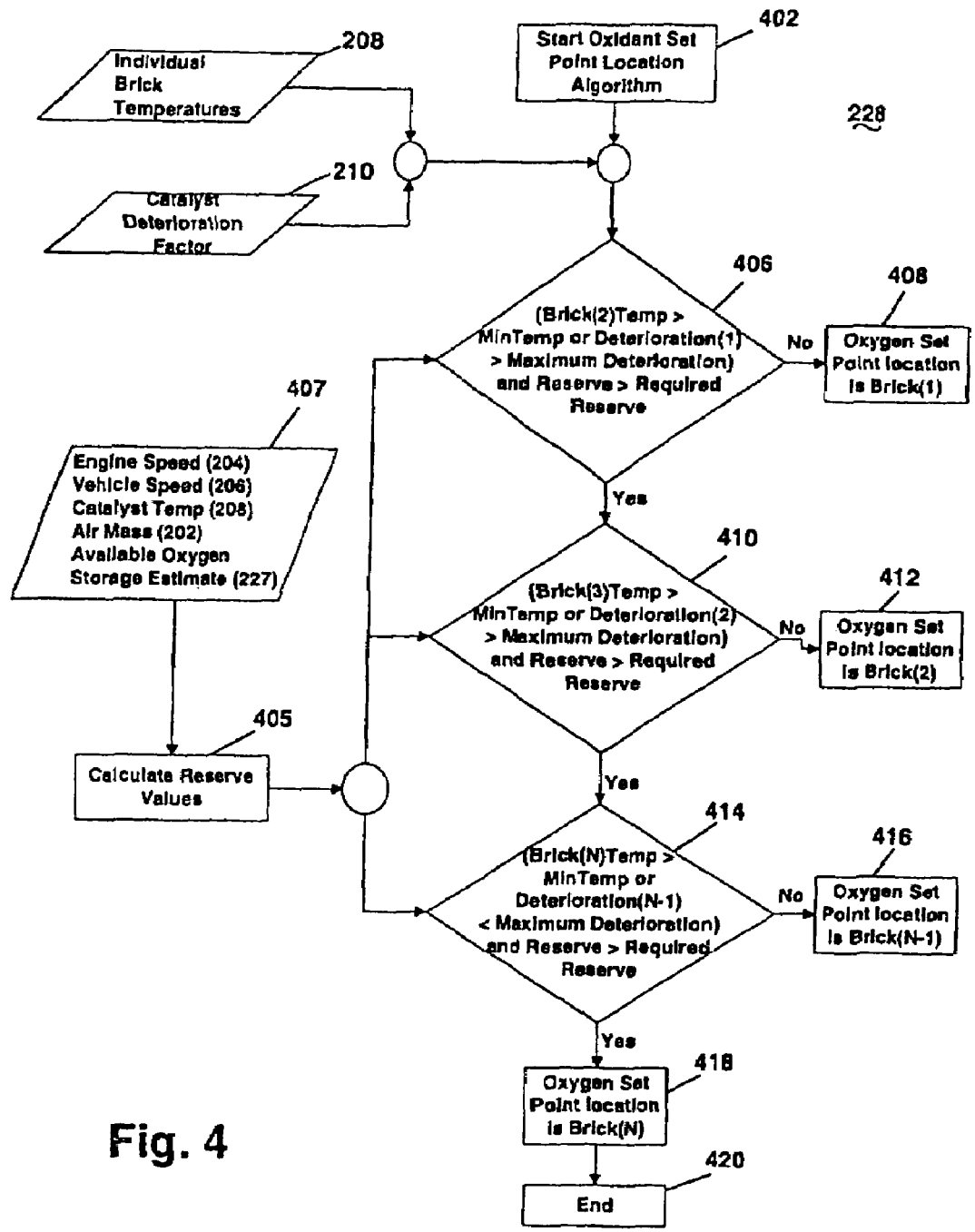
FIG. 4 is a flowchart that illustrates a preferred embodiment of the oxidant set point location algorithm of the present invention.

Referring now to FIG. 4, a more detailed description of the oxidant set point location algorithm (228) will be described. An object of the oxidant set point location algorithm (228) is to identify the particular brick in a multiple-brick catalyst 52 at which it is desirable to control the oxidant storage, i.e. the "set point location." Actually, the oxidant set point is positioned just behind a given brick. In this way, the available oxidant storage capacity of the catalyst is considered to be that of the set point brick plus all of the bricks forward of the set point brick in the catalyst. Because the bricks in a catalyst tend to fill with oxidants unevenly, normally from front to back, and because oxidant storage is largely a function of temperature, and because the storage capacity of catalyst bricks deteriorate over time, it is desirable to selectively choose where in the catalyst (i.e., which brick) to control the oxidant level around. Further, selectively choosing the key brick enables the system to better control the distribution of oxidant storage throughout the various bricks in the catalyst.

At block 402 in FIG. 4, the algorithm is started. Blocks 208 and 210 signify the individual brick temperatures and the catalyst deterioration factor, respectively, as inputs to the algorithm. The catalyst deterioration factor is determined according to one of the preferred methods described above. The individual brick temperatures (208), and the catalyst deterioration factor (210) are used subsequently in the set point location algorithm to determine the oxidant set point location.

In block 405, a required oxidant reserve capacity is calculated for the entire catalyst. The oxidant reserve capacity is the current storage capacity of the bricks positioned behind the oxidant set point. It is desirable to maintain a certain minimum oxidant reserve capacity to accommodate inaccuracies and transients in the system. The oxidant capacity reserve is maintained so that if an unexpected rich/lean break occurs at the set point, there is sufficient oxidant storage capability remaining in the catalyst (in the bricks positioned behind the set point) to prevent total system breakthrough. The catalyst reserve capacity is calculated from the amount of oxidant storage available in each brick (227), as well as induction air mass (202), engine speed (204), vehicle speed (206), and catalyst brick temperature (208), as shown in block 407. Specifically, the catalyst capacity reserve equals the total oxidant storage capacity of the catalyst less the oxidant storage capacity in the bricks in front of the set point location. Because the engine control strategy focuses on controlling the air/fuel ratio based on the storage capacity of the bricks in front of the set point, any additional storage capacity of bricks located behind the set point (as a result of the temperature of subsequent bricks rising) constitutes the available capacity reserve. As described below, the preferred embodiment of the invention always maintains a certain storage capacity reserve by only adjusting the set point location if the resulting storage capacity reserve is greater than a certain minimum "required reserve".

Based on the individual brick temperatures (208), the catalyst deterioration factor (210) and the required oxidant storage reserve (405), the oxidant set point location algorithm (228) determines the set point location according to blocks 406-418 and per the following description. Initially, it is assumed that the set point location is the most forward brick (brick(1)) in the catalyst 52. That is, the invented system will control the engine air/fuel ratio based on the oxidant storage capacity of the first brick only (which is the only brick located in front of the set point). At block 406, it is determined if (i) the temperature of the second brick (brick(2)) in the catalyst 52 exceeds a predetermined minimum brick temperature or (ii) if the deterioration factor of the first brick (brick(1)) is greater than a predetermined maximum deterioration factor. If either of these conditions is true, and if the oxidant storage capacity reserve of the catalyst with the set point being the second brick (brick(2)) is greater than the required reserve, then the set point location moves from the first brick (brick(1)) to the second brick (brick(2)). If not, then the set point location remains at the first brick (brick(1)), as shown at block 408.

At block 410, a similar test is performed. It is determined if the temperature of the third brick (brick(3)) is greater than a predetermined minimum temperature or if the deterioration factor of the second brick (brick(2)) is greater than a predetermined maximum deterioration factor. If either of these conditions is true, and if the oxidant storage capacity reserve of the catalyst would be greater than the required reserve with the third brick being the set point, then the set point location moves from the second brick (brick(2)) to the third brick (brick(3)). If not, then the set point location remains at the second brick (brick(2)), as shown at block 412. Thus, the invented system would control the engine air/fuel ratio based on the oxidant storage capacity of the first and second bricks together.

This same procedure is repeated, as shown in blocks 414–418 until a final set point location is determined. One skilled in the art will appreciate that the described oxidant set point location algorithm generally causes the set point to move from the forward bricks toward the rearward bricks as the temperature of the catalyst bricks increase from front to rear. This is because the storage capacity of catalyst bricks increases with brick temperature. Thus, during a cold start, the oxidant set point location will usually start out being the first (most forward) brick in the catalyst, and the set point location will migrate rearward as the temperature of the rearward bricks increase. Further, aging/deterioration of the catalyst will tend to move the oxidant set point location rearward in the chain of bricks more quickly, since the forward bricks will tend to have less capacity as they deteriorate. Finally, extended idle or low load (low air mass flow) operation of the vehicle may cause the set point location to migrate forward in the chain of bricks if the temperature of the rearward bricks falls. In general, it is desirable in the preferred embodiment of the invention to maintain the set point location at approximately one half to two thirds of the total catalyst storage capacity to provide a preferred reserve capacity capable of sufficiently accommodating system transient inaccuracies.

The preferred embodiment of the oxidant set point location algorithm described above involves identifying a particular brick as the set point. However, in an alternative preferred embodiment of the invention, the oxidant set point can be established within any of the bricks of a multiple-brick catalyst. Thus, instead of setting the set point behind brick 1 or brick 2, for instance, the set point can be set at various points inside of brick 1 or brick 2. The set point can then be moved through the interiors of the various bricks based on a calculation of the oxidant storage capacity before and after the set point within the brick. Using a model wherein the oxidant set point can be set inside of the various bricks may increase accuracy of the estimations and control of the oxidant storage.

Figure 5:
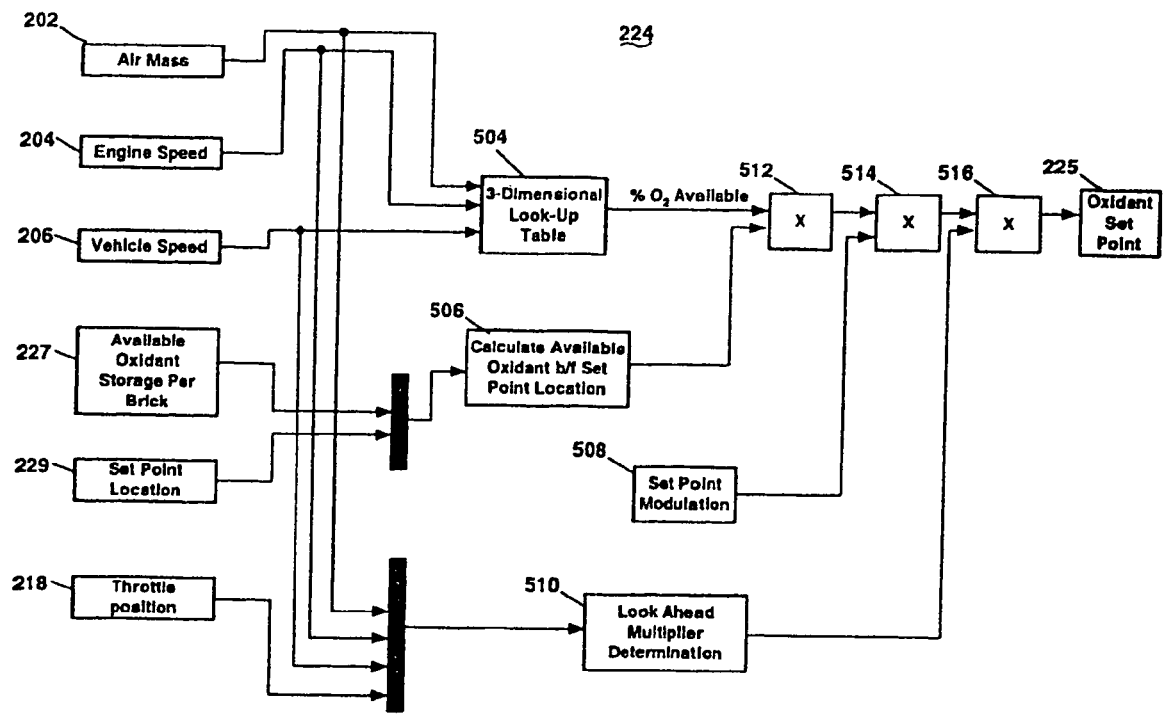
FIG. 5 is a schematic diagram illustrating the operation of the oxidant set point generator algorithm of the present invention.

Referring now to FIG. 5, a more detailed description of the oxidant set point generator (block 224 in FIG. 2) is provided. An object of the oxidant set point generator (224) is to calculate a desired target oxidant storage amount, i.e., the oxidant set point, that the invented system will attempt to maintain stored in the bricks in front of the set point location. As indicated previously, the following input parameters are provided to the oxidant set point generator: (i) air mass (202); (ii) engine speed (204); (iii) vehicle speed (206); (iv) available oxidant storage in each brick (227); (v) set point location (229); and (vi) throttle position (218). Based on these input parameters, the oxidant set point generator calculates a desired target oxidant storage level (225 of FIG. 2) as a percentage of the total oxidant storage capacity of the catalyst 52. This desired target oxidant storage level (225), or "oxidant set point", is the critical value upon which the engine control signals are generated.

In a preferred embodiment of the invention, as shown in block 504, the air mass (202), engine speed (204) and vehicle speed (206) parameters are used as index values into a three-dimensional look-up table (504). The output of the look-up table (504) is a value that represents a desired percentage of available oxidant storage capacity in the catalyst 52. The values in the lookup table (502) are empirically determined based on optimal catalyst conversion efficiency, and they are preset at the time of manufacture. Steady state efficiencies are used as a basis for determining desired oxidant set points, and set points that provide the highest efficiencies with some immunity to disturbances are selected. At block 506, a value indicative of the volume of available oxidant storage in the bricks in front of the oxidant set point location in the catalyst is determined based on the set point location (229) and the available oxidant storage per brick (227). To do so, the desired percentage of available oxidant storage in the catalyst 52 (from 504) is multiplied by the volume of available oxidant storage in the bricks in front of the set point (from 506) at block 512. The resulting product is a base oxidant set point, which consists of a target amount of oxidants to be stored in the catalyst 52.

A set point modulation function (508) is applied to the product at block 514 based on engine speed (204) and load (202) to improve catalyst efficiency, as is known by those skilled in the art. Finally, at block 510, a look-ahead multiplier value is determined based upon air mass (202), engine speed (204), vehicle speed (206) and throttle position (218) parameters. A purpose of the look-ahead multiplier is to adjust the oxidant set point based on expected future operating conditions. For example, the oxidant set point may be established at a relatively low value after the vehicle operator tips out and the vehicle stops because it is reasonably certain that a tip-in condition will occur shortly thereafter. The expected tip-in condition will produce higher levels of NOx, and the low set point will compensate for this condition. The look-ahead multiplier is applied at block 516 by multiplying the look-ahead multiplier by the modulated base set point. The product is a final oxidant set point (225), representing a target oxidant storage level in the catalyst (in grams per cubic inch).

An alternative embodiment of the oxidant set point generator (224) involves using a four dimensional look-up table to combine the functions of the three dimensional look-up table (504) and the look-ahead multiplier determination (510). Essentially, the function of the look-ahead multiplier would be incorporated into the fourth dimension of the look-up table. In this embodiment, the oxidant set point would be determined from the four dimensional look-up table based on air mass (202), engine speed (204), vehicle speed (206), and throttle position (218). The output of the four-dimensional look-up table would be the target oxidant setpoint, and no modification based on a look-ahead multiplier would be necessary.

In preferred embodiments of the invention, the oxidant set point is prevented from being set at a level that exceeds the functional limits of the catalytic converter, i.e., greater than the total oxidant storage capacity of the catalyst or less than zero. Preferably, the oxidant set point is limited to between about 30% and about 70% of the total catalyst storage capacity. In other preferred embodiments of the invention, parameters other than engine speed and load and vehicle speed, such as catalyst temperature, EGR and ignition timing, may be used to determine a desirable oxidant set point. Moreover, the present invention is equally applicable to systems wherein the oxidant set point is a constant value, such as, for example, 50% of the total oxidant storage capacity of the catalytic converter 52, in which case the entire oxidant set point generator algorithm (224) could be replaced with a constant value.

Figure 6:
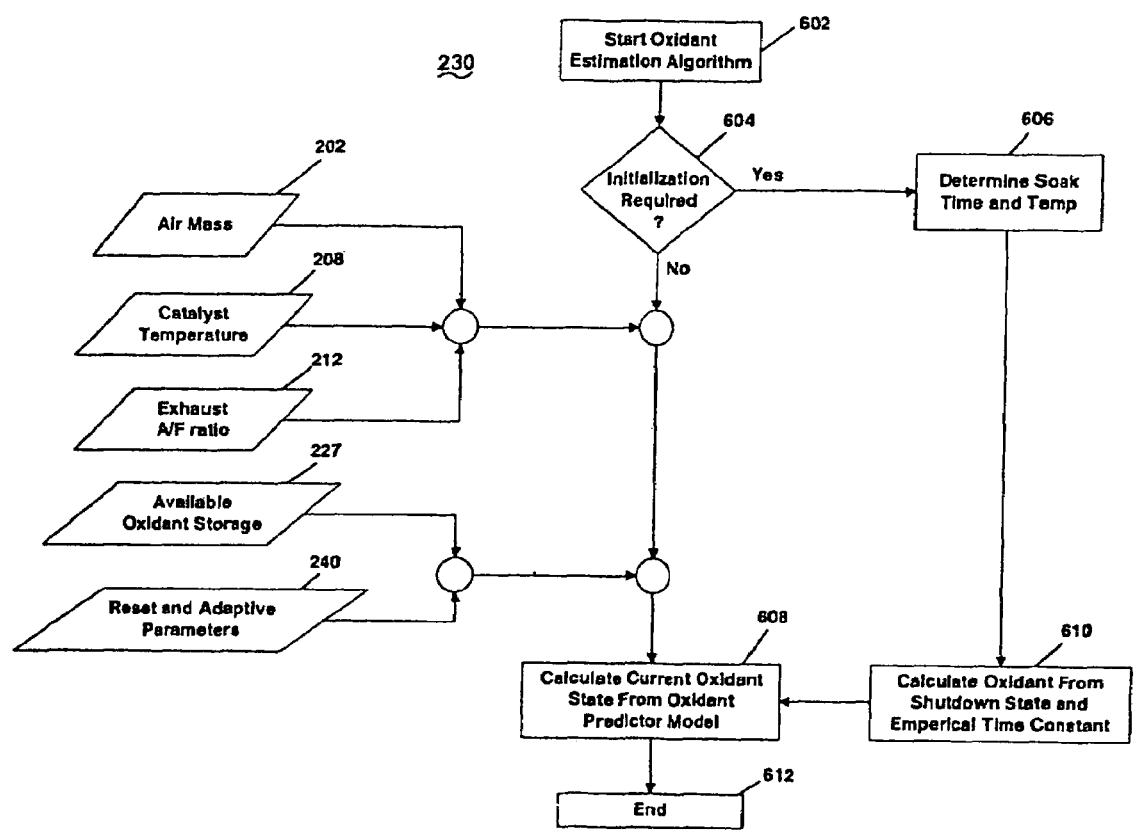
FIG. 6 is a flowchart that illustrates a preferred embodiment of the current oxidant level estimator algorithm of the present invention.

Referring now to FIG. 6, a more detailed description of the "oxidant level estimator" algorithm (230), which estimates the instantaneous oxidant levels in the bricks of catalyst 52, is provided. The results of this algorithm are used ultimately by the oxidant level/capacity controller (232) to adjust the engine air/fuel ratio based on a comparison of the estimated oxidant storage in the catalyst with the oxidant set point.

The oxidant level estimator algorithm begins at block 602. At block 604, it is determined whether an oxidant state initialization is required, i.e., whether or not the vehicle has just been started. If the vehicle has just been started, then the oxidant estimator model must be initialized because oxidants tend to gradually fill the catalyst for a period after the vehicle has been turned off, then are released as the catalyst cools. An initialization of the oxidant estimator model involves determining the oxidant state of the catalyst 52 based on the "soak time" (time since the vehicle was turned off) and the current temperature of the catalyst. If the soak time is relatively long, then the current oxidant level of the catalyst 52 is determined to be a preset value corresponding to a "cold start" of the vehicle because it is assumed that the catalyst has filled with oxidant to a predictable level. On the other hand, if the soak time is relatively short, then catalyst 52 has likely not yet filled with oxidant to the same extent as during an extended soak. Therefore, the initial oxidant state of catalyst 52 is determined based on the last oxidant state (before the vehicle was turned off), the soak time, the current catalyst temperature, and an empirical time constant, as shown in block 610.

Regardless of the initial oxidant level in the catalyst bricks, the current oxidant levels are calculated according to the oxidant level predictor model, or "observer", described below based on air mass (202), catalyst temperature (208), exhaust air/fuel ratio (212), available oxidant storage (227) and reset and adaptive feedback parameters (240) derived from the oxidant level controller (232). The oxidant predictor model calculation occurs at block 608 according to the following method.

The actual amount of oxidants stored in the catalytic converter 52 is continually estimated using a mathematical oxidant predictor model or "observer." At preset times T, the oxidant predictor model estimates the amount of oxidants ($\Delta O_2$) adsorbed and/or desorbed in the catalytic converter 52 over the time interval $\Delta T$ from the previous time $T_{i-1}$ to the current preset time $T_i$. A running total value is maintained in the RAM memory 116 that represents the current estimate of the amount of oxidants stored in the catalytic converter 52. The estimated change in the amount of oxidants ($\Delta O_2$) stored in the catalytic converter is added to or subtracted from the running total value maintained in RAM 116 on an iterative basis. Therefore, at any one time, RAM memory 116 contains the most current estimate of the total amount of oxidants stored in the catalytic converter 52.

Details of how a preferred embodiment of the oxidant predictor model estimates the amount of oxidants adsorbed/desorbed at the various preset times $T_i$ (block 608) will now be described. First, the current air/fuel ratio provided to the engine cylinders is used to determine the amount of oxidants ($O_2$) that is either available for storage in the catalytic converter 52 (as a result of lean air/fuel operation) or that is needed for oxidation of hydrocarbons (as a result of rich air/fuel operation), according to the following equation:

$$O_2 = A\left[(1-\varphi)*\left(1+\frac{y}{4}\right)\right]*32 \quad (1)$$

In Equation 1 above, one skilled in the art will recognize that the variable y represents a value that varies depending upon the type of fuel used in the system. For a normal gasoline engine, y equals 1.85. The variable $\phi$ represents the air/fuel ratio in the exhaust manifold 48 upstream of the catalytic converter 52. In the preferred embodiment of the invention, the variable $\phi$ is assigned the air/fuel ratio that is commanded by the controller 15 to be provided to the engine cylinders at a given time T. It is also possible to use the output of upstream EGO sensor 54 (in FIG. 1) as the value for $\phi$ in Equation 1. Finally, the factor A represents the mole flow rate of air in the exhaust manifold 48, which is calculated according to the following Equation 2:

$$A = \frac{1}{\left(1+\frac{y}{4}\right)(MW_{O_2} + MW_{N_2} + 3.76)} \quad (2)$$

In Equation 2, the variable y is again a value that varies with the type of fuel used in the system, which is 1.85 for gasoline. The mole weight of oxidant ($MW_{O_2}$) is 32 and the mole weight of nitrogen ($MW_{N_2}$) is 28. Accordingly, for a gasoline engine, the factor A equals 0.00498 grams/sec. When Equation 1 is solved, a negative value for $O_2$ indicates that oxidant is being adsorbed by the catalyst 52, and a positive value for $O_2$ indicates that oxidant is being desorbed by the catalyst 52 to react with hydrocarbons.

Once the amount of oxidants either available for storage in the catalytic converter or required for oxidation of the hydrocarbons being produced by the engine is determined, the next step is to estimate the volume of oxidants that are actually adsorbed/desorbed by the catalytic converter. In the preferred embodiment, this estimation depends on several factors, including the volume of the catalytic converter 52, the flow rate of oxidants in the exhaust manifold 48, the percentage of the catalytic converter that is already full of oxidants, and other physical and operational characteristics of the catalytic converter. According to the preferred embodiment of the present invention, the change in the amount of oxidants stored in the catalytic converter 52 between two preset times ($\Delta T$) is estimated based on the following model:

$$\Delta O_2 = C_1 * C_2 * C_3 * C_4 \quad (3a)$$
$$\left[K_a * \left(1 - \frac{\text{Stored } O_2}{\text{Max } O_2}\right)^{N_1} * \left(\frac{O_2 \text{ Flow Rate}}{\text{Base Value}}\right)^{Z_1} * \text{Cat Vol} * \Delta T\right]$$

for Oxygen being absorbed

-continued $$\Delta O_2 = C_1 * C_2 * C_3 \quad (3b)$$
$$C_4 \left[ K_d * \left( \frac{\text{Stored } O_2}{\text{Max } O_2} \right)^{N_2} * \left( \frac{O_2 \text{ Flow Rate}}{\text{Base Value}} \right)^{Z_2} * \text{Cat Vol} * \Delta T \right]$$
for Oxygen being desorbed As indicated above, Equation (3a) is used to calculate the change in oxidant storage in the catalytic converter if the catalyst is in an adsorption mode and Equation (3b) is used if the catalyst is in a desorption mode.

Figure 8A:
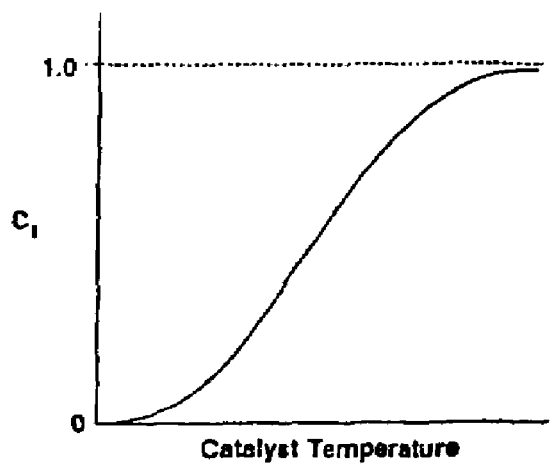
FIG. 8A is a graph that illustrates the relationship between the temperature of a catalytic converter and a variable, $C_1$, that is used to estimate an amount of oxidants stored in the catalytic converter.

In Equations (3a) and (3b), the variables $C_1$, $C_2$, and $C_3$ are assigned values to compensate for various functional and operational characteristics of the catalytic converter. The value of $C_1$ is determined according to a mathematical function or look-up table based on the catalyst temperature. The preferred embodiment of the invention uses a mathematical function represented by the graph in FIG. 8A, which illustrates that a catalytic converter is most active when the catalyst is hot and least active when it is cold. The catalyst temperature can be determined according to several different methods that are well-known to those of skill in the art, including by a catalyst temperature sensor. After determined, the catalyst temperature is used to assign a value to $C_1$ according to the function shown in FIG. 8A.

Figure 8B:
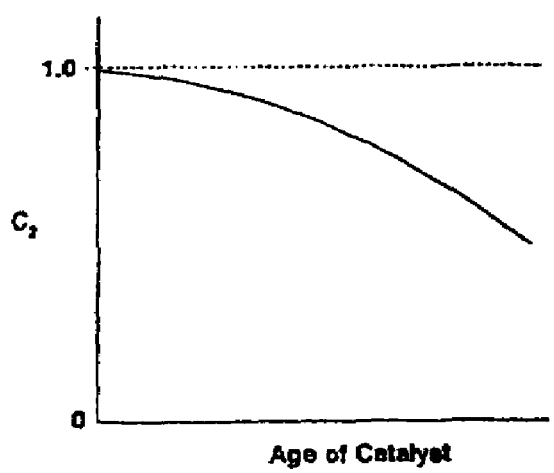
FIG. 8B is a graph that illustrates the relationship between the age of a catalytic converter and a variable, $C_2$, that is used to estimate an amount of oxidants stored in the catalytic converter.

The value of $C_2$ in Equations (3a) and (3b) is determined based on the deterioration of the catalytic converter. The deterioration of the catalytic converter can be determined by a variety of well-known methods, including, for example, inferring such age or deterioration from the vehicle's total mileage (recorded by the vehicle's odometer) or total amount of fuel used over the vehicle's lifetime. Further, a catalytic deterioration factor can be calculated according to one of the preferred methods described hereinabove. FIG. 8B shows a graphical representation of a preferred mathematical function used to assign values to $C_2$ in the preferred embodiment of the invention. FIG. 8B illustrates that a catalytic converter's efficiency (ability to adsorb and/or desorb oxidants) decreases with its age.

Figure 8C:
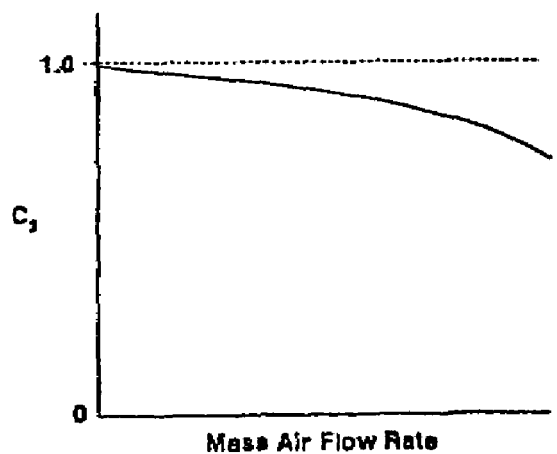
FIG. 8C is a graph that illustrates the relationship between engine mass air flow and a variable, $C_3$, that is used to estimate an amount of oxidants stored in the catalytic converter.

The value of $C_3$ is determined by a mathematical function or map based on the mass airflow in the exhaust manifold 48. FIG. 8C graphically illustrates a preferred mathematical function used in the preferred embodiment of the invention to assign values to $C_3$, depending on the mass airflow rate in the induction manifold 48. As can be seen, the adsorption/desorption efficiency of the catalyst decreases as the mass flow rate increases.

The value of $C_4$ is derived from the adaptive parameters (240) calculated by the oxidant level/capacity controller (232). The $C_4$ value essentially provides feedback capabilities to the model, making the preferred embodiment of the model a closed-loop system. Specifically, the value of $C_4$ is read from a two-dimensional look-up table of adaptive parameters. The primary index to the look-up table is air mass flow (202). For each air mass flow value, there are two $C_4$ values—one for when the catalyst is adsorbing oxidants (equation 3(a)) and one for when the catalyst is desorbing oxidants (equation 3(b)). Thus, the value of $C_4$ used in equations 3(a) and 3(b) above varies from time to time with the measured air mass flow in the engine. Further, the values in the $C_4$ look-up table are all adjusted from time to time based on a feedback error term. In particular, the $C_4$ values initially start out as 1. During operation, the estimated oxidant storage level in the catalyst, as determined by this oxidant predictor model now being described, is compared to an oxidant level as measured by oxygen sensors in the catalyst (i.e., sensors 902, 904, 906 in FIG. 9) and outside of the catalyst in the exhaust stream (i.e., sensors 53 and 54 in FIG. 1). The difference between the estimated amount of stored oxidants and the measured amount of stored oxidants is considered an oxidant feedback error term. The values in the $C_4$ look-up table are adjusted from time to time based on the oxidant feedback error. A more detailed discussion of the oxidant feedback error and the adjustment to the $C_4$ values is set forth below in connection with the discussion of FIG. 7.

The above-description of applying the feedback parameter $C_4$ is different if the system does not have oxygen sensors positioned behind each of the bricks, as shown in FIG. 9. If such oxygen sensors do not exist, then the system depends only on the feedback signal derived from post-catalyst oxygen sensor 53. Thus, it is not possible to decouple individual adsorbtion/desorbtion rates from the individual bricks. Under these circumstances, a single two-dimensional look-up table (indexed by air mass values) of $C_4$ values is used, and the same $C_4$ parameter is multiplied by the oxidant storage estimate for each brick in the catalyst. When a single set of $C_4$ parameters are used (as opposed to different $C_4$ values for each brick), it is possible to weight the adsorbtion/desorbtion contributions of the bricks according to pre-determined weighting factors.

In Equation (3a), the value of $k_a$ represents the maximum adsorbing rate of the catalytic converter in terms of grams of oxidants per second per cubic inch. Similarly, in Equation (3b), the value of $k_d$ represents the maximum desorbing rate of the catalytic converter in terms of grams of oxidants per second per cubic inch. The values of $k_a$ and $k_d$ are pre-determined based on the specifications of the particular catalytic converter being used.

The value for Max $O_2$ in both Equation (3a) and Equation (3b) represents the maximum amount of oxidants that the catalyst 52 is capable of storing in terms of grams. This is a constant value that is pre-determined according to the specifications of the particular catalytic converter used in the system. The value for Stored $O_2$ in Equations (3a) and (3b) represents the previously-calculated current amount of oxidants stored in the catalytic converter 52 in terms of grams. The value for Stored $O_2$ is read from RAM 116.

The value for $O_2$ Flow Rate in Equation (3a) and Equation (3b) represents the mass air flow rate in the induction manifold 18, which is measured by mass air flow sensor 158. The Base Value in Equation (3a) and Equation (3b) represents the oxygen flow rate where $K_d$ and $K_a$ were determined and it is (PPM $O_2$ of input gas)*(volumetric flow rate)*(density of $O_2$).

The Cat Vol parameter in Equation (3a) and Equation (3b) represents the total volume of the catalytic converter in terms of cubic inches. This value is pre-determined based on the type of catalytic converter being used. The value $\Delta T$ in both equations represents the elapsed time in seconds since the last estimation of the change in oxidant storage in the catalyst.

Finally, the values of $N_1$, $N_2$, $Z_1$, and $Z_2$ are exponents that express the probability of desorption/adsorption and they are determined by experimentally measuring rates of adsorption/desorption at given levels of storage and flow. The exponents are regressed from measurements and can be used to describe linear to sigmoid probabilities.

After the change in estimated oxidant storage in the catalyst 52 is calculated according to Equation (3a) or Equation (3b), the running total of the current oxidant storage maintained in RAM memory 116 is updated accordingly. Specifically, the amount of oxidants either adsorbed or desorbed is added/subtracted to the running total of oxidant storage, which is maintained in RAM memory 116.

The oxidant predictor model may be employed either in an open loop manner or a closed loop manner, as is known to those skilled in the art in view of this disclosure. In an open loop embodiment, the oxidant predictor model described hereinabove estimates the volume of oxidants stored in the catalyst based on various parameters, such as temperature, air mass flow rate, etc., without input from any feedback parameters. Modifying equations 3(a) and 3(b) above to eliminate the $C_4$ variable would illustrate a preferred open loop embodiment of the oxidant predictor model.

Figure 7:
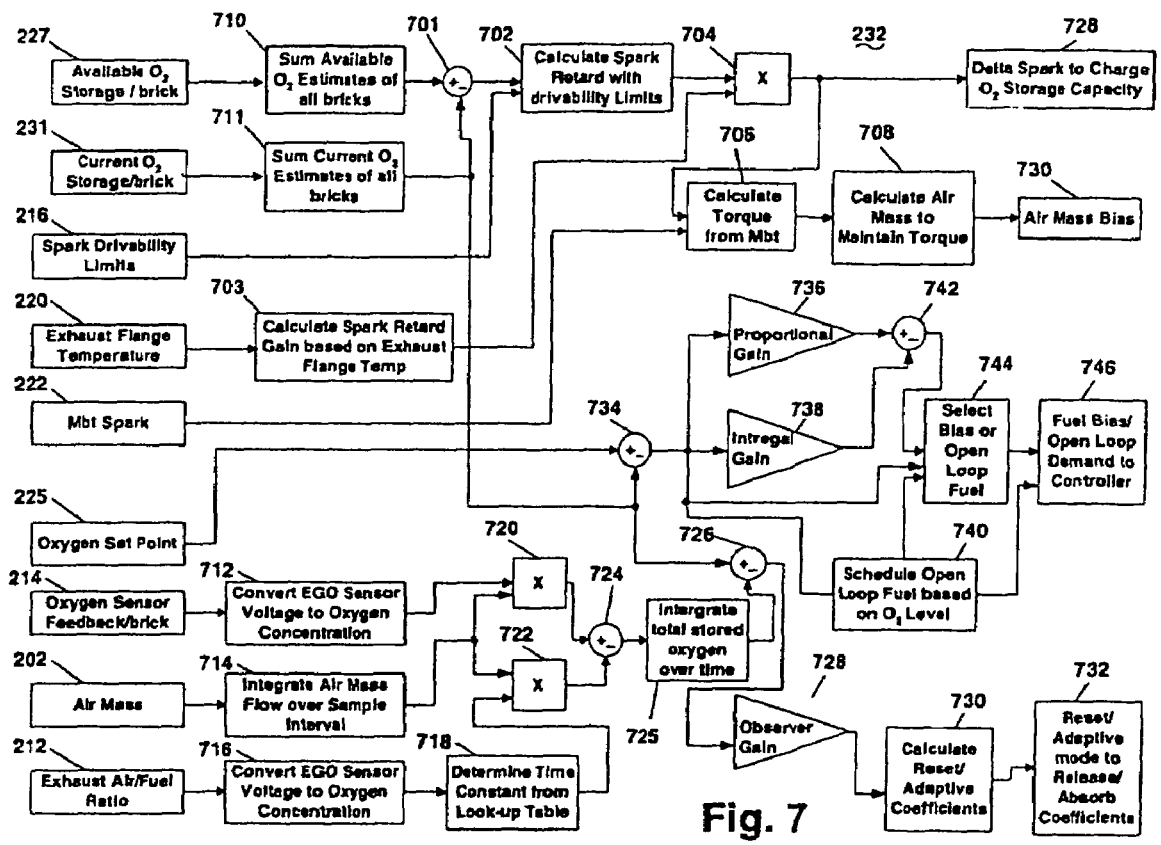
FIG. 7 is a schematic diagram illustrating the operation of the oxidant level/capacity controller algorithm of the present invention.

In a closed loop embodiment, on the other hand, the oxidant predictor model further includes a mechanism for adjusting the estimated volume of stored oxidants in the catalyst based on various feedback signals. In particular, after the oxidant predictor model estimates the volume of oxidants stored in the catalytic converter at a particular time, according to the method described above, this estimated value is used to calculate various other predicted parameters that are compared against corresponding measured feedback parameters. In the preferred embodiment of the invention described above, the $C_4$ variable provides feedback based on the measurements of the catalyst oxygen sensors (i.e., sensors 902, 904, 906) and the pre-catalyst oxygen sensor 54. The feedback parameters could also comprise signals from the downstream EGO sensor 53 (shown in FIG. 1) or any of several other well-known feedback parameters. Regardless of the specific feedback signal used, the value of the feedback signal would be compared to the value of the parameter calculated from the estimated oxidant storage level in the catalyst, and the result of the comparison would be a feedback error term. The feedback error term would be used to increase or decrease the estimate of the volume of stored oxidants, as calculated by the oxidant predictor model per the method described above. The implementation of a closed-loop embodiment of the oxidant predictor model may be advantageous because the feedback signals may enable the oxidant predictor model to more accurately estimate the volume of oxidant stored in the catalyst. In the preferred embodiment of this invention, the $C_4$ parameter, which is adjusted based on the adaptive parameters described in FIG. 7, is applied to adjust the oxidant predictor model. Thus, the preferred embodiment of the invention adjusts the predicted level of oxidant stored in the catalyst in a closed-loop fashion.

In the preferred embodiment of the oxidant level predictor, a reset parameter also affects the model. In particular, if the comparison between the estimated amount of stored oxidants and the measured amount of stored oxidants produces a very large oxidant feedback error (i.e., greater than a certain reference value), which may occur as a result of large transients in the system, then it is desirable to "reset" the oxidant level predictor model instead of allowing the model to gradually correct itself. For example, if the measured oxidant level in the catalyst is very high, but the estimated oxidant level is very low, then the oxidant level predictor may reset itself to a relatively high storage value. Similarly, if the measured oxidant level in the catalyst is very low, but the estimated oxidant level is very high, then the oxidant level predictor may reset itself to a relatively low storage value. The "reset" function is a second form of corrective feedback in the model, and it facilitates more rapid correction of large errors.

Those skilled in the art, in view of this disclosure, will recognize various modifications or additions that can be made to the above-described oxidant predictor model. For example, a well-known heated exhaust gas oxidant (HEGO) sensor, which generally provides an output signal indicative of only a lean or rich condition, can be used in place of the downstream EGO sensor 53. In this case, when the downstream HEGO sensor provides a signal somewhere between lean and rich, no adjustment is made to the estimated amount of oxidants stored in the catalyst. On the other hand, when the downstream HEGO clearly indicates a lean air/fuel condition, the amount of estimated stored oxidant in the catalyst can be set to the maximum amount that can be stored at the current vehicle operating conditions. Further, when the downstream HEGO sensor indicates a clearly rich air/fuel condition, the estimated amount of stored oxidant can be set to zero. These adjustments represent a re-setting of the estimated amount of oxidants stored based on the downstream HEGO sensor. According to the present invention, the improvement in the estimated amount of oxidants stored in the catalyst 52 based on a feedback error signal can result in improved catalyst emissions.

Referring now to FIG. 7, the oxidant level/capacity controller (232) is described in more detail. A first object of the oxidant level/capacity controller (232) is to calculate an air/fuel control bias for the purpose of adjusting the air/fuel ratio in the engine cylinders to maintain the actual oxidant storage level in the catalyst 52 at or near the oxidant set point. A second object of the oxidant level/capacity controller (232) is to calculate an engine spark delta value and an air mass bias value, both of which are used to control the oxidant storage capacity of the catalyst 52 through adjusting the temperature of the catalyst. A final object of the oxidant level/capacity controller (232) is to calculate reset and adaptive parameters based on feedback signals from the oxygen sensors in the exhaust stream and in the catalyst.

The first function of the oxidant level/capacity controller (232) is generally accomplished by comparing the oxidant set point (225) to the estimated actual amount of oxidants stored in the catalytic converter 52 at a particular time T. The difference between the actual amount of oxidants stored in the catalytic converter 52 and the oxidant set point (225) is referred to herein as the "set point error." The set point error indicates whether the volume of oxidants stored in the catalytic converter 52 is too high or too low relative to the oxidant set point. Based on the set point error, an air/fuel control bias signal is generated, which affects the ultimate air/fuel control signals sent by the controller 15 to the fuel injectors 18 to adjust the air/fuel ratio either more rich or more lean. Specifically, if the estimated actual amount of oxidants stored in the catalytic converter is less than the oxidant set point, then the controller 15 will adjust the amount of fuel supplied to the engine cylinders so that the engine air/fuel ratio is more lean. On the other hand, if the estimated actual amount of oxidants stored in the catalytic converter is more than the oxidant set point, then the controller will adjust the amount of fuel supplied to the engine cylinders so that the engine air/fuel ratio is more rich.

Referring specifically to FIG. 7, the following input parameters are used in connection with determining the air/fuel control bias value: (i) current oxidant storage per brick (231); and (ii) oxidant set point (225). First, at block 711, the estimates of oxidants currently stored in each of the catalyst bricks (signal 231) are summed, resulting in an estimate of the total amount of oxidants currently stored in all of the bricks of catalyst 52. Next, the setpoint error is determined by comparing the total oxidants currently stored in the catalyst (711) to the oxidant set point (225) at block 734. The set point error is provided to a proportional-integral controller (blocks 736, 738, and 742), which calculates an air/fuel control bias term. In a preferred embodiment of the invention, the proportional-integral controller uses the set point error to calculate a closed-loop fuel bias term according to a proportional-integral strategy similar to that described in detail in U.S. Pat. No. 5,282,360 to Hamburg, which is hereby incorporated by reference. Specifically, as described in the Hamburg patent, a "window" is defined around the catalytic setpoint. For example, if the catalytic setpoint is determined to be X, then the lower limit of the "window" might be set at X−Y and the upper limit of the "window" would be set at X+Z. The variables X and Z represent specific variances from the catalytic setpoint. In relationship to the Hamburg patent, the lower and upper limits of the "window" (X−Y) correspond to the rich and lean limits described in the Hamburg patent at lines 1:62–2:5. The upper and lower limits of the window are selectively determined based upon vehicle operating conditions, such as vehicle speed, engine load and engine temperature, as is known in the art. When the estimated oxidant volume (derived by the observer 206) is outside of the "window", then the commanded air/fuel ratio (provided to the engine cylinders) is linearly ramped so as to urge the oxidant storage in the catalyst toward the oxidant set point. For example, when the estimated oxidant volume is greater than the upper limit of the window, then the commanded air/fuel ratio is linearly ramped in the rich direction, and when the estimated oxidant volume is less than the lower limit of the window, then the commanded air/fuel ratio is linearly ramped in the lean direction. When the estimated oxidant volume is between the lower and upper limits of the window, the air/fuel ratio is urged toward the oxidant set point according to a value that is proportional to the difference between the estimated volume of oxidant stored in the catalyst 52 and the oxidant set point. Further details of the preferred proportional-integral air/fuel ratio control strategy are set forth in the Hamburg patent.

In addition to calculating a proportional-integral fuel bias term, the set point error is also used to schedule an open loop fuel demand value based on the estimated oxidant level in the catalyst. At block 744, the system determines whether to apply the closed-loop proportional-integral fuel bias term or the open loop fuel demand, based on various operating parameters, as is known in the art. For example, the open-loop fuel demand parameter may be used in place of the closed-loop fuel bias term in the event of a very large set point error value, indicating irregularities in the system. The open-loop fuel demand parameter may also be used just after the vehicle has been operated in a deceleration fuel shut-off mode, in which case a period of rich air/fuel operation is required to control the abundance of NOx in the system. Further, the open-loop fuel demand parameter may be used just after the vehicle has been operated according to an open-loop enrichment mode (where fuel is used to keep catalyst temperatures down during high load conditions), in which case a period of lean air/fuel operation is desirable to re-oxidize the catalyst and lower hydrocarbon emissions. Whether open loop rich or lean, the magnitude and duration are used to facilitate a rapid return to the $O_2$ set point. Finally, as shown at block 746, either the closed-loop fuel bias term or the open loop fuel demand parameter is provided to the engine controller 15, which adjusts the fuel provided to the engine cylinders based thereon.

The second objective of the oxidant level/capacity controller (232), i.e., oxidant capacity control of the catalyst 52, will now be discussed in more detail. Referring again to FIG. 7, the following inputs are used to calculate delta spark and induction air mass bias values: (i) available oxidant storage in each brick (227); (ii) current oxidant storage in each brick (231); (iii) engine spark driveability limits (216); exhaust flange temperature (220); and MBT spark (222). First, the estimates of available oxidant storage and current oxidant storage in each of the catalyst bricks are summed (blocks 710 and 711), resulting in an estimate of the total available oxidant storage in the catalyst and an estimate of the total current amount of oxidants stored in the catalyst, respectively. Then, the total available oxidant storage value (710) is compared to the total current estimated oxidant storage in the catalyst (711) at block 713. At block 702, a spark retard value is calculated based on the difference between available oxidant storage and current oxidant storage in the catalyst (from block 713) and spark driveability limits (216). In the preferred embodiment of the invention, the spark retard value (702) is read from a look-up table, wherein the values are empirically determined. The spark retard values in the look-up table generally describe the well-known relationship between oxidant storage and brick temperature, as shown in the graph set forth in FIG. 8A. The spark driveability limits, which are pre-determined inputs to the system, limit the magnitude of the spark retard (702) to ensure that vehicle driveability is not compromised.

Figure 10:
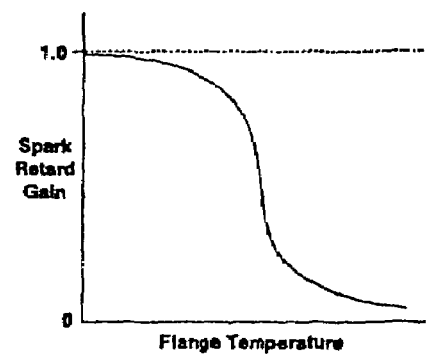
FIG. 10 is a graph that illustrates the relationship between flange temperature and spark retard gain.

At block 703, a spark retard gain is calculated based on the exhaust flange temperature (220). Generally, if the flange temperature (220) is relatively high, or increasing, due to high air mass flow or engine air/fuel ratio, then the oxidant storage capacity of the catalyst will increase independently of the spark. Thus, a relatively hot flange will permit the catalyst to achieve a desired temperature (and thus oxidant storage capacity) with a relatively lesser delta spark. This is desirable to improve fuel economy. In the preferred embodiment of the invention, the spark retard gain (703) is read from a look-up table, the values of which are empirically-determined. In general, the values in the spark retard gain table follow the graphical function illustrated in FIG. 10. The spark retard gain (703) is multiplied by the spark retard value (702), as shown at block 704, which results in a delta spark value (728). The delta spark value (728) is provided to the engine controller 15 to adjust the engine spark, and ultimately the oxidant storage capacity of the catalyst. Generally speaking, the larger the difference between the total available oxidant storage in the catalyst and the total current oxidant storage in the catalyst, the greater the delta spark value.

However, as spark retard increases, engine rpm will fall if not compensated by additional air mass flow through the engine. Accordingly, the delta spark value (728) is used with the MBT spark input value (222) at block 706 to calculate a required engine torque value, as is known in the art. At block 708, the induction air mass necessary to maintain the required torque is calculated. In the preferred embodiment of the invention, the desired air mass flow is calculated by dividing the base air mass flow requirements of the engine by an adjustment factor, which is read from a look-up table. The adjustment factors in the look-up table range from 1, when at MBT, to some fractional value down to zero as spark retard increases. Thus, as spark retard increases, the desired air mass flow increases. This air mass value comprises the air mass bias value (730), which is used by the engine controller 15 to adjust the induction air mass in the engine 13. The adjustments to the engine spark and induction air mass adjust the temperature of the exhaust expelled from the engine and thus, ultimately, the temperature of the catalyst 52. Because the oxidant storage capacity of the catalyst 52 depends on its temperature, the engine controller 15 is able to adjust the oxidant storage capacity of the catalyst 52 by adjusting the engine spark and induction air mass flow. This aspect of the invention is particularly useful during certain vehicle operating conditions when the catalyst temperature may fall to a level that would otherwise limit the oxidant storage capacity of the catalytic converter 52 to an undesirable small amount. By controlling engine operating conditions to provide a desired catalyst temperature, a certain minimum amount of total oxidant storage capacity can be maintained so that it is possible to control the actual oxidant storage to a mid-region and prevent break-through of emissions on the lean and rich air/fuel sides.

The third objective of the oxidant level/capacity controller is to determine reset/adaptive parameters that are used to adjust the operation of the system on a feed-back basis. The reset/adaptive parameters (732) are calculated based on the following inputs: (i) current oxidant storage in each brick (231); (ii) oxygen sensor feedback from each brick (214); (iii) induction air mass (202); and (iv) measured air/fuel ratio in the exhaust (212). The feedback signals from the oxygen sensors associated with each of the catalyst bricks (214) (exemplary sensors 902, 904, and 905 shown in FIG. 9), which are in terms of voltage levels, are converted to oxidant concentration values at block 712. A similar function is performed at block 716 to convert the feedback signal from the pre-catalyst oxygen sensor 54 located in the exhaust stream to an oxidant concentration value. At block 714, the measured air mass flow rate (202) in the induction passage is integrated over a sample time interval to provide a total air mass in terms of grams. At block 718, a time constant value is determined from a look-up table based on air mass. The time constant is used to align the pre-catalyst oxygen sensor 54 and the post-catalyst oxygen sensor 53 in time to facilitate an accurate measure of the oxidants that are adsorbed or desorbed in the catalyst.

At block 720, the measured oxidant concentrations of the individual bricks (from block 721) are multiplied by the total air mass in grams (from block 714). The result of block 720 is the amount of oxidants measured at the catalyst brick. Similarly, the time constant determined from the look-up table (block 718) is multiplied by the total air mass (from block 714) at block 722. The result is the amount of oxidants measured in the exhaust stream. At block 724, the results of blocks 720 and 722 are compared, and the result is integrated over a time constant (in block 725) to give a total measured amount of oxidants in the exhaust stream over the given time period. The final integrated result is the total measured amount of oxidants stored in the catalyst 52. At block 726, the total measured amount of oxidants stored in the catalyst is compared to the estimated amount of oxidants stored in the catalyst (estimated from the oxidant predictor model). The result is an "observer error." The observer error represents the degree of disagreement between the measured level of oxidant storage in the catalyst and the estimated level of oxidant storage in the catalyst. Based on the observer error, an observer gain is calculated at block 728. The observer gain is used to adjust the two-dimensional look-up table of feedback parameters $C_4$ (described above) that are used to adjust the oxidant level predictor (608). Specifically, at block 730, the observer gain is multiplied by each of the $C_4$ feedback parameters in the two-dimensional look-up table. At block 732, the recalculated two-dimensional look-up table of $C_4$ values is provided to the oxidant level predictor (608) and other algorithms in the system requiring closed-loop feedback adjustments.

Further, a reset parameter is calculated at block 730 based on the magnitude of the oxidant feedback error. If the oxidant feedback error is greater than a certain reference value, then a reset parameter indicative of resetting the oxidant predictor model (608) to either a low oxidant level or a high oxidant level, as the case may be, is determined.

The description of the preferred embodiment of the invention focuses on a system having one catalytic converter (52). However, the scope of the invention also includes systems comprising multiple upstream and downstream catalytic converters, wherein each of the catalytic converters can have one or more internal catalyst bricks. For systems having multiple catalytic converters, the above-described system would be adapted as now described.

In particular, adaptation of the oxygen storage model from a single brick to multiple brick system is accomplished by cascading oxygen output from upstream bricks to downstream bricks. The ratio of air to fuel, a measure of excess/deficiency O2 from stoichiometry, entering the first brick is measured or calculated from the fuel control algorithm. Therefore, the excess/deficiency of oxygen can be calculated as described earlier. The amount of oxygen adsorbed/desorbed by the first brick from the exhaust gas is calculated as described. By adding the oxygen stored or supplied to the exhaust feed gas the post brick a/f, excess/deficiency can be calculated. The second brick o2 storage is then calculated with a similar set of equations, modified for temperature and washcoat differences. In this way output from one brick is cascaded to the following brick.

While preferred embodiments of the present invention have been described herein, it is apparent that the basic construction can be altered to provide other embodiments that utilize the processes and compositions of this invention. Therefore, it will be appreciated that the scope of this invention is to be defined by the claims appended hereto rather than by the specific embodiments that have been presented hereinbefore by way of example.

We claim:

1. A catalyst deterioration detecting apparatus for an internal combustion engine, comprising:
   a controller that:
   detects an amount of oxygen stored in an upstream catalyst and a separate amount of oxygen stored in a downstream catalyst;
   controls the amount of stored oxygen in the upstream catalyst by controlling an air-fuel ratio of gasses that flow into the catalyst based on said detected amounts;
   detects an oxygen storage capacity of the upstream catalyst based on said detected amount of stored oxygen in the upstream catalyst; and
   determines degradation of said upstream catalyst based on said detected oxygen storage capacity of the upstream catalyst.

2. The apparatus of claim 1 further comprising an upstream exhaust gas oxygen sensor located upstream of said upstream catalyst, and a downstream exhaust gas oxygen sensor located between said upstream catalyst and said downstream catalyst.

3. The apparatus of claim 2 wherein said controller further detects said amount of oxygen stored in said upstream catalyst and said amount of oxygen stored in said downstream catalyst based on said upstream and downstream sensors.

4. A catalyst deterioration detecting apparatus for an internal combustion engine, comprising:
   a controller that:
   detects an amount of oxygen stored in an upstream catalyst and an amount of oxygen stored in a downstream catalyst;
   controls the amount of stored oxygen in the upstream catalyst by controlling an air-fuel ratio of gasses that flow into the upstream catalyst;
   detects an oxygen storage capacity of the upstream catalyst based on said detected amount of stored oxygen in the upstream catalyst during vehicle operation;
   determines degradation of said upstream catalyst based on said detected oxygen storage capacity;
   an upstream exhaust gas oxygen sensor located upstream of said upstream catalyst: and
   a downstream exhaust gas oxygen sensor located between said upstream catalyst and said downstream catalyst.

5. The apparatus of claim 4 wherein said controller further detects said amount of oxygen stored in said upstream catalyst and said amount of oxygen stored in said downstream catalyst based on said upstream and downstream sensors.

6. A catalyst deterioration detecting apparatus for an internal combustion engine, comprising:
a controller that:
detects an amount of oxygen stored in an upstream catalyst and an amount of oxygen stored in a downstream catalyst;
controls the amount of stored oxygen in the upstream catalyst by controlling an air-fuel ratio of gasses that flow into the catalyst; and
detects an oxygen storage capacity of the upstream catalyst based on operation where the engine is operated lean to fill the upstream catalyst with oxygen and then the engine is operated rich;
determines degradation of said upstream catalyst based on said detected oxygen storage capacity;
an upstream exhaust gas oxygen sensor located upstream of said upstream catalyst; and
a downstream exhaust gas oxygen sensor located between said upstream catalyst and said downstream catalyst.

7. The apparatus of claim 6 wherein said controller further detects said amount of oxygen stored in said upstream catalyst and said amount of oxygen stored in said downstream catalyst based on said upstream and downstream sensors.

8. The apparatus of claim 6 wherein said lean operation is ended based on said downstream sensor.

9. A catalyst deterioration detecting apparatus for an internal combustion engine, comprising:
a controller that:
detects an amount of oxygen stored in an upstream catalyst and a separate amount of oxygen stored in a downstream catalyst;
controls the amount of stored oxygen in the upstream catalyst by controlling an air-fuel ratio of gasses that flow into the catalyst; and
detects an oxygen storage capacity of the upstream catalyst based on operation where the engine is operated rich to deplete oxygen in the upstream catalyst and then the engine is operated lean; and
determines degradation of said upstream catalyst based on said detected oxygen storage capacity of said upstream catalyst.

10. The apparatus of claim 9 further comprising an upstream exhaust gas oxygen sensor located upstream of said upstream catalyst, and a downstream exhaust gas oxygen sensor located between said upstream catalyst and said downstream catalyst.

11. The apparatus of claim 10 wherein said controller further detects said amount of oxygen stored in said upstream catalyst and said amount of oxygen stored in said downstream catalyst based on said upstream and downstream sensors.

12. The apparatus of claim 9 wherein said rich operation is ended based on said downstream sensor.

13. A method for detecting deterioration of a catalyst for an internal combustion engine, the method comprising:
detecting an amount of stored oxygen in the catalyst;
controlling said amount of stored oxygen in the catalyst by adjusting air-fuel ratio of the engine based on said detected amount of stored oxygen in the catalyst;
determining degradation of the catalyst based on said detected amount of stored oxygen in the catalyst, wherein said determining degradation includes determining a level of degradation.

14. The method of claim 13 wherein said control is based on an error between a set point amount of oxygen storage and said detected amount of stored oxygen in the catalyst.

15. The method of claim 14 wherein said set point is at a location in an exhaust system, said location moved based on engine operating conditions.

16. The method of claim 14 wherein set point location is moved along a length of the exhaust system.

17. The method of claim 14 wherein set point location is moved between different positions in a catalyst brick.

18. The method of claim 14 wherein set point location is moved between different catalysts.

19. The method of claim 14 wherein set point location is moved between different catalyst bricks.

20. The method of claim 13 wherein said adjusting air-fuel ratio of the engine includes adjusting injected fuel that enters the engine combustion chamber.

21. The method of claim 13 wherein said determining degradation includes determining a rate of degradation.

22. A method for detecting deterioration of a catalyst for an internal combustion engine, the method comprising:
detecting an amount of stored oxygen in the catalyst;
controlling said amount of stored oxygen in the catalyst by adjusting air-fuel ratio of the engine based on said detected amount of stored oxygen in the catalyst;
detecting an oxygen storage capacity of the catalyst based on said detected amount of stored oxygen in the catalyst;
determining degradation of the catalyst based on said detected oxygen storage capacity of the catalyst; and
wherein said control is based on an error between a set point amount of oxygen storage and said detected amount of stored oxygen in the catalyst.

23. The method of claim 22 wherein said set point is at a location in an exhaust system, said location moved based on engine operating conditions.

24. The method of claim 22 wherein set point location is moved along a length of the exhaust system.

25. The method of claim 22 wherein set point location is moved between different positions in a catalyst brick.

26. The method of claim 22 wherein set point location is moved between different catalysts.

27. The method of claim 22 wherein set point location is moved between different catalyst bricks.

28. The method of claim 22 wherein said adjusting air-fuel ratio of the engine includes adjusting injected fuel that enters the engine combustion chamber.

29. The method of claim 22 wherein said determining degradation includes determining a level of degradation.

30. The method of claim 22 wherein said determining degradation includes determining a rate of degradation.

* * * * *